United States Patent
Scott et al.

(10) Patent No.: US 12,181,872 B1
(45) Date of Patent: *Dec. 31, 2024

(54) SYSTEMS AND METHODS FOR CONTROLLING OPERATION OF AUTONOMOUS VEHICLE SYSTEMS

(71) Applicant: United Services Automobile Association (USAA), San Antonio, TX (US)

(72) Inventors: Kade L. Scott, The Colony, TX (US); Benjamin D. Ethington, Fruit Heights, UT (US); Richard Daniel Graham, Plano, TX (US); Matthew T. Flachsbart, Fort Worth, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,685

(22) Filed: Nov. 9, 2023

Related U.S. Application Data

(63) Continuation of application No. 17/875,846, filed on Jul. 28, 2022, now Pat. No. 11,853,058, which is a continuation of application No. 16/784,102, filed on Feb. 6, 2020, now Pat. No. 11,435,740, which is a continuation of application No. 15/869,424, filed on Jan. 12, 2018, now Pat. No. 10,599,143.

(60) Provisional application No. 62/446,127, filed on Jan. 13, 2017.

(51) Int. Cl.
*G05D 1/00* (2024.01)
*B60W 30/18* (2012.01)
*B60W 50/14* (2020.01)

(52) U.S. Cl.
CPC ........... *G05D 1/0061* (2013.01); *B60W 30/18* (2013.01); *B60W 50/14* (2013.01); *G05D 1/021* (2013.01); *B60W 2050/143* (2013.01); *B60W 2520/10* (2013.01); *B60W 2552/00* (2020.02); *B60W 2554/00* (2020.02); *B60W 2720/10* (2013.01)

(58) Field of Classification Search
CPC ........ G05D 1/0061; G05D 1/021; G05D 1/00; B60W 30/18; B60W 50/14; B60W 2050/143; B60W 2520/10; B60W 2552/00; B60W 2554/00; B60W 2720/10; G08G 1/16
See application file for complete search history.

(56) References Cited

U.S. PATENT DOCUMENTS

| | | | |
|---|---|---|---|
| 8,170,725 B2 | 5/2012 | Chin et al. | |
| 8,294,595 B1 | 10/2012 | Plotke et al. | |
| 8,880,319 B2 | 11/2014 | Tsuruta et al. | |
| 9,466,212 B1 | 10/2016 | Stumphauzer et al. | |
| 10,279,680 B2 | 5/2019 | Burt et al. | |
| 10,599,143 B1 * | 3/2020 | Scott | B60W 30/18 |
| 10,955,855 B1 | 3/2021 | Tran | |
| 11,340,612 B2 | 5/2022 | Ishioka et al. | |

(Continued)

*Primary Examiner* — Yonel Beaulieu
(74) *Attorney, Agent, or Firm* — Fletcher Yoder, P.C.

(57) ABSTRACT

A system may include one or more sensors configured to acquire data associated with a driver of a vehicle and a processor. The processor may receive the data and determine whether the data is within a baseline data associated with expected behavior of the driver. The processor may then control one or more operations of the vehicle in response to the data being outside the baseline data.

20 Claims, 3 Drawing Sheets

(56) References Cited

U.S. PATENT DOCUMENTS

| | | |
|---|---|---|
| 11,412,139 B2 | 8/2022 | Li et al. |
| 11,435,740 B1 * | 9/2022 | Scott .................... B60W 50/14 |
| 11,524,689 B2 | 12/2022 | Hayakawa et al. |
| 11,853,058 B1 * | 12/2023 | Scott .................... B60W 30/18 |
| 2014/0139655 A1 | 5/2014 | Mimar |
| 2015/0025917 A1 | 1/2015 | Stempora |
| 2017/0305349 A1 | 10/2017 | Naboulsi |
| 2017/0341658 A1 | 11/2017 | Fung et al. |
| 2018/0022358 A1 | 1/2018 | Fung et al. |
| 2020/0117204 A1 | 4/2020 | Lindermann et al. |
| 2021/0290102 A1 | 9/2021 | Burwinkel et al. |

* cited by examiner

SYSTEMS AND METHODS FOR CONTROLLING OPERATION OF AUTONOMOUS VEHICLE SYSTEMS

CROSS REFERENCE TO RELATED APPLICATION

This application is a continuation of U.S. patent application Ser. No. 17/875,846, now U.S. Pat. No. 11,435,740, entitled "SYSTEMS AND METHODS FOR CONTROLLING OPERATION OF AUTONOMOUS VEHICLE SYSTEMS," filed Jul. 28, 2022, which in turn is a continuation of U.S. patent application Ser. No. 16/784,102, entitled "SYSTEMS AND METHODS FOR CONTROLLING OPERATION OF AUTONOMOUS VEHICLE SYSTEMS," filed Feb. 6, 2020, now U.S. Pat. No. 11,435,740, which in turn is a continuation of U.S. patent application Ser. No. 15/869,424, entitled "SYSTEMS AND METHODS FOR CONTROLLING OPERATION OF AUTONOMOUS VEHICLE SYSTEMS," filed Jan. 12, 2018, now U.S. Pat. No. 10,599,143, which claims priority to and the benefit of U.S. Provisional Application No. 62/446,127, entitled "SYSTEMS AND METHODS FOR CONTROLLING OPERATION OF AUTONOMOUS VEHICLE SYSTEMS," filed Jan. 13, 2017, each of which is hereby incorporated by reference in its entirety for all purposes.

BACKGROUND

The present disclosure relates generally to controlling operations of an autonomous driving mode of a vehicle system. More specifically, the present disclosure relates to monitoring certain conditions related to the autonomous operation of the vehicle system and adjusting the autonomous operation of the vehicle system based on the monitored conditions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include one or more sensors configured to acquire data associated with a driver of a vehicle and a processor. The processor may receive the data and determine whether the data is within baseline data associated with expected behavior of the driver. The processor may then control one or more operations of the vehicle in response to the data being outside the baseline data.

In another embodiment, a method may include receiving, via a processor, data from one or more sensors that may acquire the data associated with a driver of a vehicle. The method may then include determining whether the data corresponds to baseline data associated with expected behavior of the driver and controlling one or more operations of the vehicle in response to the data not corresponding to the baseline data.

In yet another embodiment, a non-transitory computer-readable medium may include computer-executable instructions that, when executed by a processor, cause the processor to receive a first set of data from one or more sensors disposed inside a vehicle and receive a second set of data from an electronic data source. The second set of data may include one or more traffic conditions. The processor may then determine whether the first set of data corresponds to baseline data associated with expected behavior of a driver of the vehicle based on the second set of data and control one or more operations of the vehicle in response to the first set of data not corresponding to the baseline data.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain vehicles today are capable of controlling driving operations of the vehicle, such that a human may not interact or control the vehicle as the vehicle drives to some destination. As vehicle control systems improve in the future, the ability of the vehicle control systems to operate more safely than a human operator may increase. However, regardless of how apt a vehicle control system becomes at driving a vehicle, human operators may wish to control the operation of their respective vehicles.

With the foregoing in mind, certain vehicle control systems may provide human operators with the ability to operate their respective vehicles as a default operation, upon request, and the like. In certain embodiments, the vehicle control system may reserve the ability to control the operation of the vehicle based on whether monitored behavior characteristics of the driver meet some acceptable threshold. That is, the vehicle control system may include sensors and other monitoring devices that monitor various aspects of the driver while the driver is operating the vehicle. If the vehicle control system determines that the monitored behavior of the driver may reduce a risk of the driver's safety with regard to the operation of the vehicle, the vehicle control system may engage in an autonomous driving mode and control the operation of the vehicle. In this way, the vehicle control system may actively monitor the driver and prevent the driver from operating the vehicle in such a manner that a risk of an accident is higher than if the vehicle control system assumed control of the vehicle. Additional details with regard to controlling the operation of the vehicle will be discussed below with respect to FIGS. 1-6.

Figure 1:
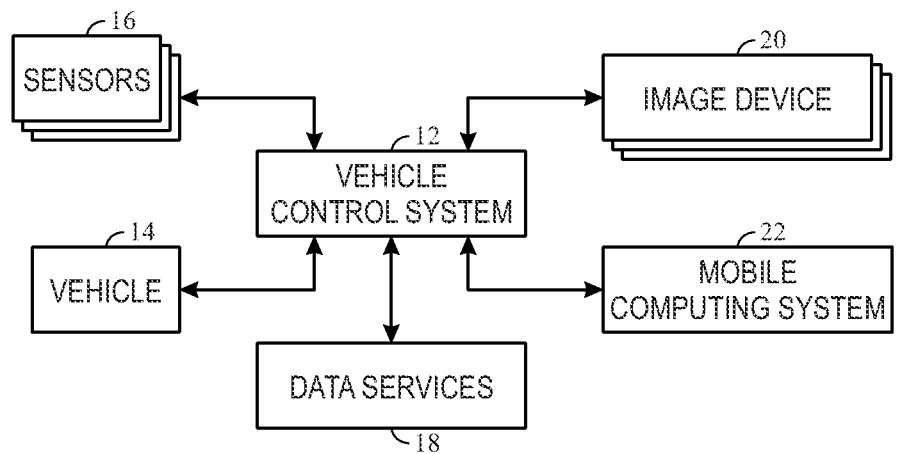
FIG. 1 illustrates a block diagram of an autonomous driving system, in accordance with embodiments described herein.

By way of introduction, FIG. 1 illustrates a block diagram of an autonomous driving system 10 that may include a vehicle control system 12 that may control one or more operations of a vehicle 14. That is, the vehicle control system 12 may control, for example, driving operations of the vehicle 14, operations of accessories (e.g., radio) within the vehicle 14, and the like. The vehicle 14 may be any suitable vehicle (e.g., car, van, truck, farming equipment, construction equipment) that may be controlled and operated via a processor-based device, such as the vehicle control system 12.

In some embodiments, the vehicle control system 12 may receive data from various data sources regarding the operation of the vehicle 14, one or more behavioral characteristics of the vehicle 14, certain traffic condition, road condition, and weather conditions of an area in which the vehicle 14 is located, and the like. The various data sources may include sensors 16, data services 18, one or more image devices 20, a mobile computing system 22, and the like. Generally, the data received from the various data sources may assist the vehicle control system 12 to determine whether a risk of damage to a vehicle 14 (or another vehicle), to some property accessible by the vehicle 14, to a driver of the vehicle 14, or to a driver of another vehicle exceeds a threshold and control the vehicle 14 based on the risk.

Keeping this in mind, the sensors 16 may include any suitable sensing device capable of detecting various behaviors of the driver of the vehicle 14. For instance, the sensors 16 may include a device capable of detecting location, vibration, touch, temperature, sound, speed, motion, light, and the like. One or more sensors 16 may be disposed at various locations within the vehicle 14 such as the steering wheel, dashboard, seat, armrest, mirrors, and the like. In certain embodiments, the sensors 16 may be disposed on devices carried by or worn by individuals. For example, the sensors 16 may be disposed on mobile phones, wearable electronics, and the like. In one embodiment, the sensors 16 may provide location information regarding the vehicle. As such, the sensors 16 may provide global positioning system (GPS) coordinates and the like to indicate a location of the vehicle.

In another embodiment, the sensors 16 may indoor positioning system (IPS) coordinates or locations of the driver with respect to the vehicle 14. IPS may include sensors that locate objects inside a structure using radio waves, magnetic fields, acoustic signals, and other suitable signals. For instance, the sensors 16 may detect locations of a driver's face, eyes, hands, feet, and the like. The data acquired by the sensors 16 may be provided to the vehicle control system 12 via a wired or wireless communication link. The vehicle control system 12 may use the data acquired via the sensors 16 to monitor the behavior of the driver or additional passengers in the car. Based on whether the driver and the additional passengers are positioned in appropriate places within the vehicle 14, the vehicle control system 12 may determine whether to enter an autonomous driving mode and control the operation of the vehicle 14.

By way of example, the data acquired by the sensors 16 may indicate that the driver's hands are not on the steering wheel, a passenger is moving to other seats in the vehicle, the sound pressure (e.g., decibel) of voices of the driver and/or passenger, and the like. Upon receiving the data from the sensors 16, the vehicle control system 12 may compare the data to baseline data regarding the driver's or passenger's position within the vehicle. If the data from the sensors 16 do not substantially match the baseline data, the vehicle control system 12 may control the operation of the vehicle 14. For instance, if the respective baseline data indicates the driver's hands are on the steering wheel, the passenger is seated in an appropriate seat in the vehicle, the sound pressure (e.g., decibel) of voices of the driver and/or passenger is less than a threshold, the vehicle control system 12 may not enter the autonomous driving mode. The autonomous driving mode may involve providing the vehicle control system 12 access to the control parameters (e.g., accelerator, brakes, steering wheel, radio, air conditioning, electrical accessories), such that the vehicle control system 12 may control the operation (e.g., driving) of the vehicle 14. As such, the vehicle control system 12 may prevent the driver from controlling the vehicle 14 during situations when the behaviors of the driver and the passenger may increase a risk of injury to a person or vehicle.

Referring back to FIG. 1, the data services 18 may include one or more databases, websites, or information collection organizations that acquire data regarding individuals, vehicles, environment, and the like. For instance, the data services 18 may include social media websites that are updated to indicate a person's current location, state of mind, and the like. The social media data may include data available via social media sites such as Facebook®, Twitter®, and the like. In one embodiment, the social media data may be associated with the driver or passengers within the vehicle 14. In some instances, the social media data may include information regarding a natural disaster, traffic conditions, dangerous situation (e.g., active shooter), road conditions, and the like.

In addition, the data services 18 may include electronic news sources that may be updated in real time or near real time via a network (e.g., Internet). The electronic news sources may provide information regarding weather alerts, natural disaster alerts, non-natural disaster alerts (e.g., traffic, active shooter), and any other information that may be published via an electronic news outlet such as a webpage, news database, or the like. The data services 18 may also provide information related to road conditions (e.g., ice, snow) of the roads being driven on by the vehicle 14. Road condition information may also include information regarding whether construction is present along a traveled path or route, whether traffic signs, traffic lane lines, traffic reflectors, and the like are visible and detectable by a certain threshold (e.g., percentage) of drivers, and the like. Additional data regarding the road conditions may include a determination as to whether the driven path differs or deviates from information provided via the data services 18.

In some embodiments, the vehicle control system 12 may be communicatively coupled to one or more image devices 20, such as cameras. The image devices 20 may provide the vehicle control system 12 a field of vision outside the vehicle 14 and within the vehicle 14. The image device 20 may provide data regarding the identity of the driver and passenger in the vehicle, the settings of various equipment within the vehicle 14, the operating conditions (e.g., speed) of the vehicle 14, and the like. The imaging device 20 may also monitor the driving of the vehicle 14 with respect to the road being driven to determine whether the vehicle 14 is being driven within appropriate lanes and not drifting between lanes during the drive.

The vehicle control system 12 may also be communicatively coupled to one or more mobile computing systems 22, such as a laptop computer, a wearable electronic device, a mobile phone, and the like. The mobile computing system 22 may provide data regarding the use of the mobile computing system 22, such that the vehicle control system 12 may determine whether the driver is distracted by content displayed via the mobile computing system 22. In one embodiment, the vehicle control system 12 may receive data regarding the activity (e.g., text message, browser searching) of the mobile computing system 22 and may enter the autonomous driving mode if the data indicates that the mobile computing system 22 is active, while the vehicle 14 is in motion. It should be noted that the mobile computing system 22 may also include sensors 16, access to data services 18, and image devices 20 thereon, such that the data acquired from these components may be provided to the vehicle control system 12 via a wired or wireless communication link.

As discussed above, the vehicle control system 12 may receive data from the various sources described above and determine whether the driver is distracted from driving, operating the vehicle 14 in a manner that may increase risk of an accident as compared to the comparative risk associated with the autonomous driving mode, and the like. If the vehicle control system 12 determines that the risk of an accident when the driver operates the vehicle 14 is higher than when the vehicle control system 12 controls the vehicle 14, the vehicle control system 12 may prevent the driver from controlling the vehicle 14 and enter the autonomous driving mode. Additional details with regard to various components within the vehicle control system 12 will be discussed below with reference to FIG. 2.

In some embodiments, upon entering the autonomous mode, the vehicle control system 12 may send a notification including information (e.g., date, time, triggering event) to a display within the vehicle 14, the mobile computing system 22, a third party (e.g., insurance company), or the like. It should be noted that the notification may also be provided via audio of the vehicle 14. The information gleaned from the notification may be provided to assist insurance providers to assess an insurance risk to the driver, to provide information to a policy holder regarding the driving behavior of the driver, and the like. Although the notification has been described as being displayed or presented in an audible format, it should be noted that the notification of the vehicle control system 12 entering the autonomous mode may be provided by any suitable means including a scent released by the vehicle control system 12, a vibration provided at the hands, feet, or other body part of the driver, or a combination of the various notifications described herein.

Figure 2:
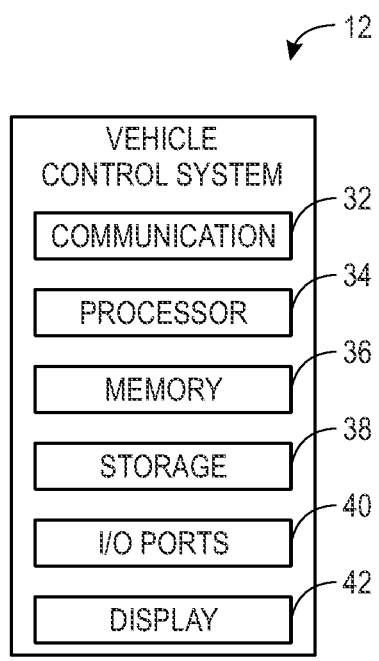
FIG. 2 illustrates a block diagram of components that are part of a vehicle control system of the autonomous driving system of FIG. 1, in accordance with embodiments described herein.

To perform some of the actions set forth above, the vehicle control system 12 may include certain components to facilitate these actions. FIG. 2 is a block diagram of example components within the vehicle control system 12. For example, the vehicle control system 12 may include a communication component 32, a processor 34, a memory 36, a storage 38, input/output (I/O) ports 40, a display 42, and the like. The communication component 32 may be a wireless or wired communication component that may facilitate communication between the vehicle control system 12, the sensors 16, the data services 18, the image devices 20, and the mobile computing system 22.

The processor 34 may be any suitable type of computer processor or microprocessor capable of executing computer-executable code. The processor 34 may also include multiple processors that may perform the operations described below.

The memory 36 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. The memory 36 and the storage 38 may also be used to store the data, various other software applications, and the like. The memory 36 and the storage 38 may represent non-transitory computer-readable media (e.g., any suitable form of memory or storage). It should be noted that non-transitory merely indicates that the media is tangible and not a signal.

The I/O ports 40 may be interfaces that may couple to other peripheral components such as input devices (e.g., keyboard, mouse), sensors, input/output (I/O) modules, and the like. The display 42 may operate to depict visualizations associated with software or executable code being processed by the processor 34. In one embodiment, the display 42 may be a touch display capable of receiving inputs from a user of the vehicle control system 12. The display 42 may be any suitable type of display, such as a liquid crystal display (LCD), plasma display, or an organic light emitting diode (OLED) display, for example. In one embodiment, the display 42 may depict the notification described above regarding entering into the autonomous driving mode.

It should be noted that the components described above with regard to the vehicle control system 12 are exemplary components and the vehicle control system 12 may include additional or fewer components as shown. Additionally, it should be noted that the mobile computing system 22 may also include similar components as described as part of the vehicle control system 12. With the foregoing in mind, additional details with regard to determining when the vehicle control system will enter the autonomous driving mode based on the behavior of the driver will be discussed below with reference to FIGS. 3-6.

Figure 3:
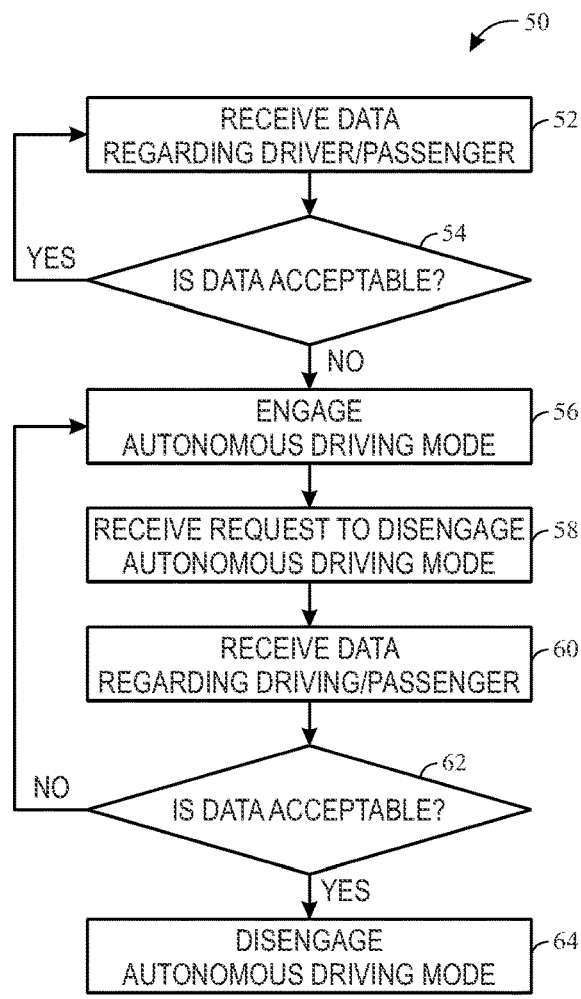
FIG. 3 illustrates a flow chart of a method for controlling an autonomous driving operation of the vehicle control system of FIG. 2, in accordance with embodiments described herein.

FIG. 3 illustrates a flow chart of a method 50 for controlling an autonomous driving mode operation of the vehicle control system 12. The following description of the method 50 will be described as being performed by the vehicle control system 12, but it should be noted that any suitable processor-based device may performed any of the methods described herein. Moreover, although the following description of the method 50 is described in a particular order, it should be understood that the method 50 may be performed in any suitable order.

Generally, the vehicle control system 12 may continuously monitor the behavior of the driver and/or passengers present in the vehicle 14, while the vehicle 14 is operated by the driver in a non-autonomous driving mode. Upon detecting that the behavior or actions by driver and/or passenger may increase a risk of injury to the driver, the passenger, other drivers, or any physical property as compared to the risk associated with the vehicle control system 12 operating the vehicle 14, the vehicle control system 12 may engage the autonomous driving mode and control the operation of the vehicle 14.

Referring now to FIG. 3, at block 52, the vehicle control system 12 may receive data regarding the driver and/or passenger in the vehicle 14. As discussed above, the data may be acquired via the sensors 16, the data services 18, the image device 20, the mobile computing system 22, or the like. The data may be related to the driver's attention to driving the vehicle 14. For instance, the data may provide information regarding whether the driver's hands are on the steering wheel, whether the driver's eyes' are focused on the road ahead or within a designated area, whether the mobile computing system 22 is actively in use, and the like. In addition, the data acquired via the data services 18 or the vehicle 14 itself may include the location of the vehicle 14, the speed of the vehicle 14, the average acceleration of the vehicle 14, speed limits of the roads that the vehicle 14 travels, and the like.

At block 54, the vehicle control system 12 may determine whether the data is acceptable. That is, the vehicle control system 12 may compare the acquired data to corresponding baseline data regarding the behavior of the driver and/or the passenger. The baseline data may include an envelope or range of expected detected behavior or patterns. For example, the baseline data may include a range of percentage values that correspond to when a driver's eyes are focused on the road ahead of the vehicle 14, some designated area (e.g., front window) of the vehicle 14, and the like. In another example, the baseline data may correspond to a range of time in which a mobile phone is determined to be in use (e.g., receiving inputs from driver) while the vehicle 14 is moving.

In addition to monitoring the behavior of the driver, in some embodiments, the vehicle control system 12 may receive environmental data (e.g., road conditions and weather advisories) via the data services 18 and determine whether the data is acceptable based on whether the environmental conditions are suitable for driving. Some additional examples in which the vehicle control system 12 may determine whether the data is acceptable are provided below with reference to FIGS. 4-6.

If the vehicle control system 12 determines that the data is acceptable or substantially matches (e.g., within acceptable range of values) corresponding baseline data, the vehicle control system 12 may return to block 52 and continue to receive data regarding the driver and/or passenger. If, however, the vehicle control system 12 determines that the data is not acceptable, the vehicle control system 12 may proceed to block 56 and enter the autonomous driving mode. That is, the vehicle control system 12 may gain control of the operation of the vehicle 14, such that the driver cannot control the operation of the vehicle. As such, the vehicle control system 12 may control the driving of the vehicle, the electrical accessories within the vehicle 14, and the like.

In some embodiments, the vehicle control system 12 may incrementally control more operational aspects of the vehicle 14 based on the detected behavior of the driver and/or passenger. For instance, the vehicle control system 12 may initially provide an audible warning to the driver that the vehicle control system 12 will enter the autonomous driving mode based on the detected behavior. In another example, the vehicle control system 12 may reduce the volume of the radio or audio device within the vehicle 14 when the data is determined to be unacceptable. Each detected unacceptable behavior pattern detected thereafter may result in the vehicle control system 12 taking more control of the operations of the vehicle 14. That is, the vehicle control system 12 may control an increasing number of operations of the vehicle 14 as it detects additional data that is outside the baseline data. For example, the vehicle control system 12 may incrementally control the audio devices within the vehicle 14, the speed of the vehicle 14, and the driving of the vehicle 14, as the behavior of the driver and/or passenger is deemed unacceptable.

After the vehicle control system 12 enters the autonomous driving mode, at block 58, the vehicle control system 12 may receive a request from the driver to disengage the autonomous driving mode. In other words, the vehicle control system 12 may receive a request to return at least a portion of control of the vehicle to the driver.

After receiving the request at block 58, the vehicle control system 12 may proceed to block 60 and begin receiving data regarding the driver and/or passenger as described above with reference to block 52. At block 62, the vehicle control system 12 may again determine whether the data is acceptable or substantially matches corresponding baseline data, as detailed above with reference to block 54. If the vehicle control system 12 determines that the data is not acceptable, the vehicle control system 12 may return to block 56. Alternatively, if the vehicle control system 12 determines that the data is acceptable, the vehicle control system 12 may proceed to block 64 and disengage the autonomous driving mode, thereby enabling the driver to control the vehicle 14.

By monitoring the behavior of the driver and passenger of the vehicle 14 along with various driving conditions of the vehicle 14, the vehicle control system 14 may make better use of the human driver and the non-human driver. That is, the vehicle control system 14 may control the vehicle 14 when the human driver may be distracted or unable to effectively control the vehicle.

Figure 4:
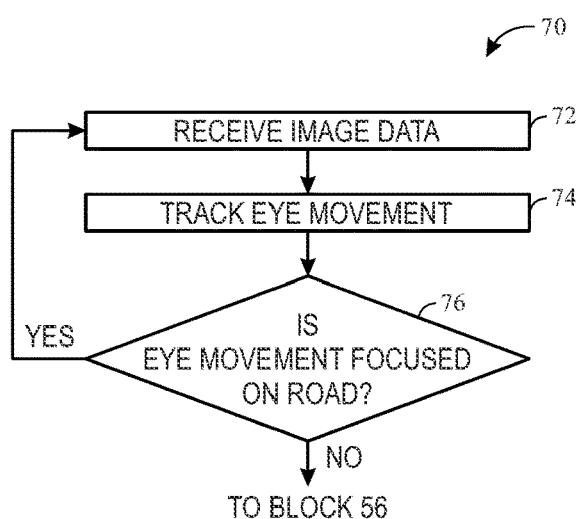
FIG. 4 illustrates a flow chart of a method for determining how to control the autonomous driving operation of the vehicle control system of FIG. 2 based on image data, in accordance with embodiments described herein.
Figure 5:
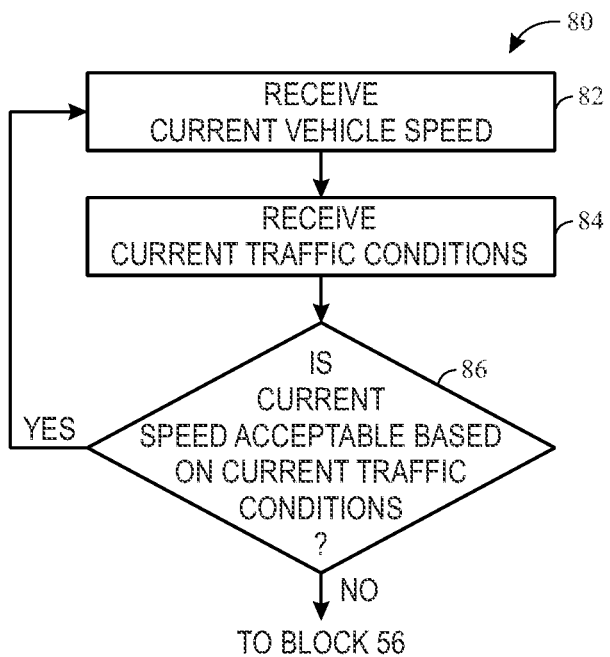
FIG. 5 illustrates a flow chart of a method for determining how to control the autonomous driving operation of the vehicle control system of FIG. 2 based on vehicle speed and traffic conditions, in accordance with embodiments described herein.
Figure 6:
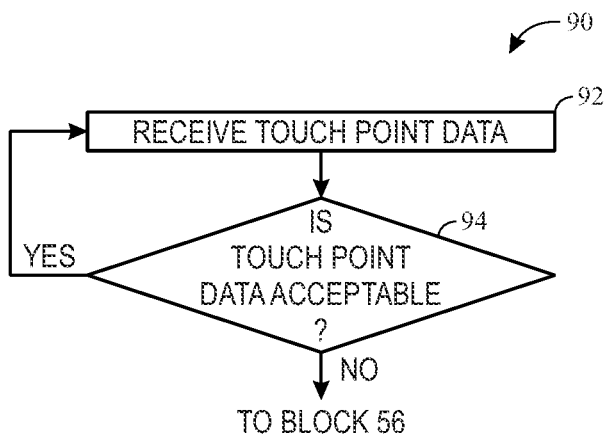
FIG. 6 illustrates a flow chart of a method for determining how to control the autonomous driving operation of the vehicle control system of FIG. 2 based on touch point data, in accordance with embodiments described herein.

Keeping the foregoing in mind, FIGS. 4-6 describe example scenarios for receiving data regarding the driver and/or passenger and determining whether the data is acceptable, as provided in blocks 52, 54, 60, and 62 of the method 50. Although FIGS. 4-6 describe specific examples of determining whether data regarding the driver and/or the passenger is acceptable, the vehicle control system 12 is not necessarily limited to the provided examples.

Referring first to the method 70 of FIG. 4, at block 72, the vehicle control system 12 may receive image data from the image devices 20 or the like. The image data may include images or video of the driver while the driver is operating the vehicle 14. At block 74, the vehicle control system 12 may track the eye movement of the driver while the vehicle 14 is in motion. If, at block 76, the vehicle control system 12 determines that the eye movement is focused on the road in front of the vehicle 14 for more than some threshold percentage of a period of time (e.g., 2 minutes), the vehicle control system 12 may determine that the data is acceptable and return to block 72. This may be done based on an ongoing averaging for a moving time window.

If, at block 76, the vehicle control system 12 determines that the eye movement is not focused on the road in front of the vehicle 14 for more than some threshold percentage of a period of time (e.g., 2 minutes), the vehicle control system 12 may determine that the data is not acceptable and proceed to block 56 of the method 50. It should be noted that the method 70 may be employed at blocks 52, 54, 60, and 62 of the method 50 to determine whether data is acceptable. That is, if the vehicle control system 12 performs the method 70 for blocks 60 and 62 of the method 50, it should be understood that the vehicle control system 12 may proceed to block 64 if the data is determined to be acceptable.

FIG. 5 illustrates another example in which the vehicle control system 12 may determine whether data regarding the driver or passenger is acceptable. Referring to FIG. 5, at block 82, the vehicle control system 12 may receive a current vehicle speed from equipment (e.g., speedometer) within the equipment, sensors 16, data services 18, the mobile computing system 22, and the like.

At block 84, the vehicle control system 12 may receive current traffic conditions in which the vehicle 14 is currently traveling from the data services 18. Based on the current speed of the vehicle 14 and the current traffic conditions, at block 86, the vehicle control system 12 may determine whether the current speed of the vehicle 14 is acceptable based on the current traffic conditions. In one embodiment, the data regarding the current traffic conditions may include a speed (e.g., average speed) associated with the movement of traffic along a respective road. In one example, if the vehicle control system 12 determines that the current speed of the vehicle 14 exceeds or lags the average speed of traffic by some threshold, the vehicle control system 12 may determine that the current speed of the vehicle 14 is not acceptable and proceed to block 56 of the method 50.

In the alternative, if the vehicle control system 12 determines that the current speed of the vehicle 14 does not exceed or lag the average speed of traffic by some threshold, the vehicle control system 12 may determine that the current speed of the vehicle 14 is acceptable and return to block 82. In one embodiment, if the method 80 is employed for blocks 60 and 62 of the method 50, the vehicle control system 12 may proceed to block 64 if the current speed of the vehicle 14 is acceptable (e.g., steering wheel).

Touch points may include, in some embodiments, pressure sensors that facilitate detection of drivers and passengers in proper seating arrangements. In addition, image devices, such as cameras, may be employed to determine whether the driver and passengers of the vehicle 14 are seated properly while in the vehicle 14. The data acquired concerning the positions of the driver and the passengers may be used as inputs for the vehicle control system 12 to control the operations of the vehicle 14 based on whether the data is within the acceptable range of positions.

FIG. 6 provides another example in which the vehicle control system 12 may determine whether the data regarding the behavior of the driver or passenger is acceptable. At block 92, the vehicle control system 12 may receive touch point data from the sensors 16. The touch point data may include information regarding whether the driver is touching a certain device (e.g., steering wheel) in the vehicle 14. At block 94, the vehicle control system 12 may determine that the touch point data is acceptable if the driver is indeed holding or touching the appropriate equipment.

If the touch point data is acceptable, the vehicle control system 12 may return to block 92. Otherwise, if the touch point data is not acceptable and the driver is not holding the appropriated equipment (e.g., steering wheel), the vehicle control system 12 may proceed to block 56 of the method 50. Again, it should be noted that when the vehicle control system 12 employs the method 90 for blocks 60 and 62 of the method 50, the vehicle control system 12 may proceed to block 64 when the touch point data is determined to be acceptable.

Although the different examples regarding determining whether behavior data related to the driver and/or passenger is acceptable are described independently, in some embodiments, each of the described methods may be combined in a number of permutations to assist the vehicle control system 12 in assessing the risk of the driver's behavior. Further, the autonomous drive mode, as represented by block 56, may include layers of autonomous procedures. Depending on the nature and number of behavior thresholds being exceeded, different levels of automated activity will occur. For example, speeding may result in a gradual reduction of throttle and touch point infractions may result in automatically pulling the vehicle 14 over to a stop.

In some embodiments, the vehicle control system 12 may also communicate with other vehicle control systems associated with other vehicles present on the road. As such, the vehicle control system 12 may gather information related to the vehicles within a distance of the respective vehicle 14 and whether the detected vehicles include an autonomous driving mode. The vehicle control system 12 may communicate with the other vehicle control systems and establish a mesh network of vehicles that may drive autonomously with regard to the driving commands of each autonomous vehicle. That is, each vehicle control system may acquire information available from each other to determine how to drive in certain conditions (e.g., road conditions, traffic conditions). In one embodiment, the vehicle control systems may collectively drive in a group mode to improve the collective driving pattern of each vehicle operated by a respective vehicle control system. By sharing information and driving patterns with each other, the collection of autonomous vehicles may improve driving response times and avoid potential accidents by driving in a coordinated manner.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
   one or more sensors configured to generate data associated driving of a vehicle;
   a processor configured to:
   receive the data indicative of the driving of the vehicle with respect to lanes of a road from the one or more sensors;
   determine whether the vehicle is being driven between the lanes of the road based on comparing at least a first portion of the data with baseline data associated with driving the vehicle between the lanes; and
   control one or more driving operations of the vehicle in response to determining that the vehicle is drifting between the lanes based on the comparison, wherein the one or more driving operations are associated with autonomously driving the vehicle.

2. The system of claim 1, wherein the baseline data comprises an envelope or range of acceptable data associated with driving the vehicle between the lanes, and wherein the processor is configured to control the one or more driving operations of the vehicle in response to the first portion of the data being outside the envelope or range of acceptable data.

3. The system of claim 1, wherein the baseline data is associated with a risk of damage to the vehicle, wherein the processor is configured to control the one or more driving operations in response to determining a higher than a threshold risk of damage to the vehicle based on comparing the first portion of the data with the baseline data.

4. The system of claim 1, wherein the one or more sensors comprise one or more global positioning systems (GPS), one or more cameras, or a combination of both.

5. The system of claim 1, wherein the first portion of the data is indicative of a field of vision outside the vehicle, wherein the processor is configured to determine whether the vehicle is being driven between the lanes of the road based on the field of the vision.

6. The system of claim 1, wherein at least a second portion of the data is indicative of an active time of an electronic device associated with a driver of the vehicle, wherein the processor is configured to:
determine whether the active time of the electronic device is within a baseline time range based on the second portion of the data; and
control the one or more driving operations of the vehicle in response to the active time being outside the baseline time range.

7. The system of claim 1, wherein the processor is configured to provide a notification via a display of the vehicle, audio of the vehicle, an electronic device associated with a driver of the vehicle, or a combination thereof in response to determining that the vehicle is drifting between the lanes.

8. The system of claim 1, wherein the processor is configured to provide a date, a time, or both, of the vehicle drifting between the lanes to a third party.

9. A system, comprising:
one or more sensors configured to generate data associated with driving of a vehicle;
a processor configured to:
receive the data indicative of an active time of an electronic device associated with a driver of the vehicle from the one or more sensors;
determine whether the active time of the electronic device is within a baseline time range based on the data; and
control one or more driving operations of the vehicle in response to the active time being outside the baseline time range, wherein the one or more driving operations are associated with autonomously driving the vehicle.

10. The system of claim 9, wherein the baseline time range corresponds to an acceptable range of time associated with the driver of the vehicle using the electronic device when the vehicle is in motion.

11. The system of claim 9, wherein the baseline time range is associated with a risk of damage to the vehicle, wherein the processor is configured to control the one or more driving operations in response to determining a higher than a threshold risk of damage to the vehicle based on comparing the active time with the baseline time range.

12. The system of claim 9, wherein the processor is configured to provide a notification via a display of the vehicle, audio of the vehicle, an electronic device associated with a driver of the vehicle, or a combination thereof in response to the active time being outside the baseline time range.

13. The system of claim 9, wherein the processor is configured to provide a date, a time, or both, of the active time of the electronic device being outside the baseline time range to a third party.

14. The system of claim 9, wherein the data is additionally indicative of the driving of the vehicle with respect to lanes of a road, wherein the processor is configured to:
determine whether the vehicle is being driven between the lanes of the road based on comparing the data with baseline data associated with driving the vehicle between the lanes; and
control the one or more driving operations of the vehicle in response to determining that the vehicle is drifting between the lanes based on the comparison.

15. The system of claim 14, wherein the one or more sensors comprise one or more global positioning systems (GPS), one or more cameras, or a combination of both.

16. The system of claim 14, wherein the one or more sensors provide the data indicative of a field of vision outside the vehicle to the processor, wherein the processor is configured to determine whether the vehicle is being driven between the lanes of the road based on the field of the vision.

17. Tangible, non-transitory, computer-readable media storing instructions that, when executed by processing circuitry, cause the processing circuitry to:
receive data indicative of driving of a vehicle with respect to lanes of a road from one or more sensors;
determine whether the vehicle is being driven between the lanes of the road based on comparing at least a portion of the data with baseline data associated with driving the vehicle between the lanes; and
control one or more driving operations of the vehicle in response to determining that the vehicle is drifting between the lanes based on the comparison, wherein the one or more driving operations are associated with autonomously driving the vehicle.

18. The tangible, non-transitory, computer-readable media of claim 17, wherein the baseline data comprises an envelope or range of acceptable data associated with driving the vehicle between the lanes, and wherein the instructions cause the processing circuitry to control the one or more driving operations of the vehicle in response to the portion of the data being outside the envelope or range of acceptable data.

19. The tangible, non-transitory, computer-readable media of claim 17, wherein the baseline data is associated with a risk of damage to the vehicle, wherein the instructions cause the processing circuitry to control the one or more driving operations in response to determining a higher than a threshold risk of damage to the vehicle based on comparing the portion of the data with the baseline data.

20. The tangible, non-transitory, computer-readable media of claim 17, wherein the instructions cause the processing circuitry to provide a notification via a display of the vehicle, audio of the vehicle, an electronic device associated with a driver of the vehicle, or a combination thereof in response to determining that the vehicle is drifting between the lanes.

\* \* \* \* \*